Sept. 2, 1924.  
W. H. KEMPTON  
COMPOSITE MOLDED STRUCTURE  
Filed June 28, 1918

1,506,756

WITNESSES:
W. S. Reece
F. A. Lind.

INVENTOR
Willard H. Kempton
BY
Wesley G. Carr
ATTORNEY

Patented Sept. 2, 1924.

1,506,756

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

COMPOSITE MOLDED STRUCTURE.

Application filed June 28, 1918. Serial No. 242,498.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Composite Molded Structures, of which the following is a specification.

My invention relates to composite molded structures and particularly to structures of the character indicated wherein insulated conducting bodies are held in spaced relation by means of molded insulating material.

The object of my invention is to provide a composite molded structure in which conducting bodies are embedded in molded insulating material which is strengthened by means of a metallic reinforcing member so arranged as to preclude the possibility of short-circuiting the conducting bodies thereby.

Heretofore, it has been customary to reinforce structures of this character by embedding in the molded material either a bare metallic reinforcing member or a metallic member separated from the conducting bodies by a rigid insulating member of suitable form. The objection to such reinforcing structure is the fact that it is very difficult to position the reinforcing member correctly and to hold it in place during the molding operation on account of the great pressure to which the molded material must be subjected. An objection to the latter structure is the fact that, when pressure is applied to mold the plastic insulating material, this pressure is transmitted to the rigid insulating member, and, as the reinforcing member is rigid and cannot yield, it is, therefore, frequently broken, thus mechanically weakening the structure and seriously impairing the insulation between the reinforcing member and the conducting bodies.

According to my present application, I provide a molded structure in which the reinforcing member is covered with a pliable insulating fabric, thus obviating the objections to the previously mentioned types of reinforcement and, at the same time, having the advantageous features thereof.

My invention is applicable to a number of structures among which are commutator cylinders for dynamo-electric machines, strain insulators, and structures of like character wherein bodies of conducting material must be maintained in spaced relation within a body of molded material. The invention is also applicable to any structure in which it is desired to embed a body, such as a metal, in a molded body of non-analogous properties.

Figure 1:
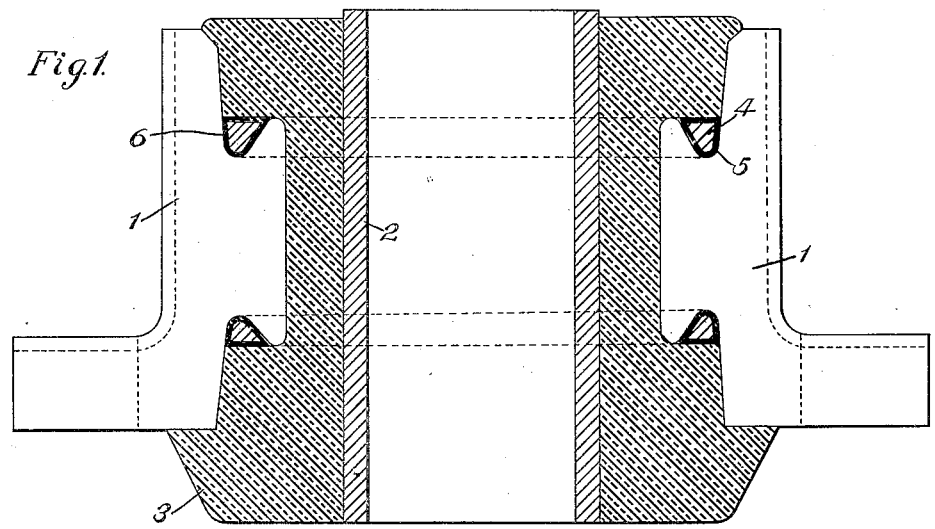
Figure 2:
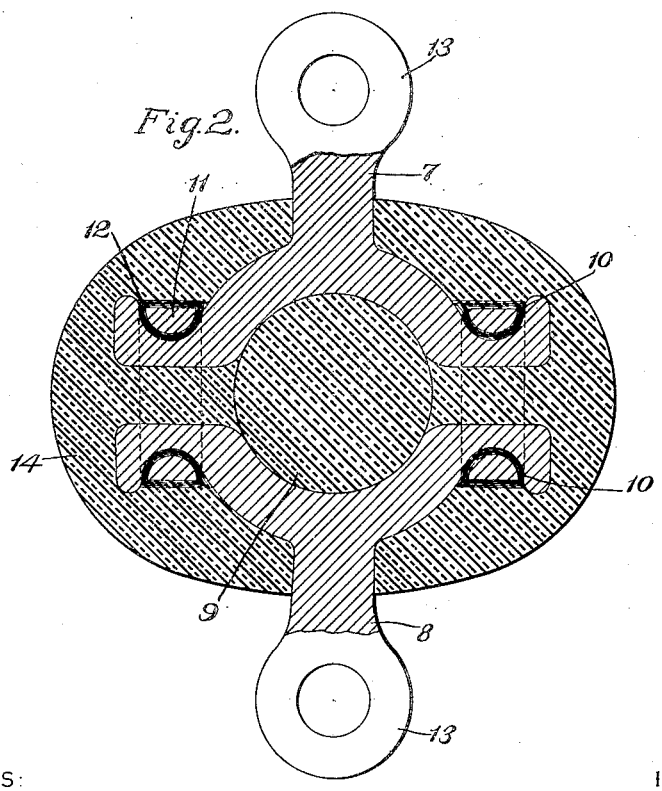

In the accompanying drawings, Fig. 1 is a longitudinal sectional view of a commutator cylinder constructed in accordance with my invention; Fig. 2 is a longitudinal sectional view of a strain insulator also constructed in accordance therewith.

In Fig. 1, I have shown a commutator cylinder comprising commutator segments 1 arranged to form a hollow cylinder about a cylindrical sleeve 2 by means of a body 3 of molded insulating material in which portions of the commutator bars are embedded. The commutator is strenghtened by means of one or more metallic rings 4 covered with impregnated tape 5, or other pliable, pervious insulating material and seated in notches 6 in the commutator segments. The impregnated tape or equivalent material 5 is composed of fibrous material which has been impregnated with an insulating compound. If a molding compound of very low viscosity be employed, the fabric 5 may be used unsaturated, since, being a pervious material, it will be saturated through contact therewith during the molding operation. The impregnating compound of the tape 5 should be of such character that it will be hardened by the molding operation, being unhardened until then. For example, both the tape and the molding composition may have a phenolic condensation product as a binder.

In Fig. 2, I have shown a strain insulator comprising two conducting bodies 7 and 8 separated by a member 9 which is composed of hardened or partially hardened insulating material. The bodies 7 and 8 are provided with notches 10, preferably symmetrically disposed therein, within which are disposed iron reinforcing rings 11 enclosed within fabric casings 12, each ring engaging notches provided in both bodies 7 and 8. The entire structure of the strain insulator, except the eyes 13 of the conductor bodies 7 and 8, is enclosed in a body 14 of molded insulating material which is reinforced by means of the rings 11. The member 9 is inserted between the bodies 7 and 8 after the rings 11 have been disposed in the notches 10, and maintains the bodies in spaced relation with respect to each other while the insulating material 14 is being molded therearound. The pliable insulating fabric, being pervious, is impregnated with a binder, either separately or by contact with the molding material, which upon hardening, unites the metallic reinforcing members, the coverings thereof, and the molding material into a single unitary mass.

Inasmuch as the fabric is pliable, previous to the hardening of its binder, it cannot be injured by the pressure of the molding material against it during molding, as is often the case where the insulating ring is rigid. At the same time, it effectively prevents any contact between the metallic rings and the conducting bodies.

The embodiment of my invention shown in Figure 2 is described and claimed in the divisional application, Serial No. 679,070, filed December 7, 1923, by me, for improvements in insulators.

While I have shown my invention in a plurality of forms, it will be obvious to those skilled in the art that it is applicable to other uses and is susceptible of various minor changes and modifications without departing from the spirit thereof and I desire, therefore, that only such limitations shall be placed thereupon as are imposed by the prior art or are specifically set forth in the appended claims.

I claim as my invention:

1. A composite element comprising spaced conducting bodies provided with notches and held in position by a body of molded insulating material and a reinforcing ring shaped to conform to said notches and embedded in said molded insulating material and disposed within said notches and consisting of a metal member covered with stranded fibrous material.

2. A composite molded structure comprising a plurality of conducting members provided with notched portions, an insulated ring disposed within said notches and directly connecting said members, and a body of insulating material molded around the the notched portions of said members and embedding said ring.

3. A commutator cylinder comprising a plurality of commutator segments provided with notched portions, a plurality of metallic ring members provided with an insulating covering disposed in direct engagement with said notched portions and positively connecting said segments, and a body of molded insulating material embedding the notched portions of segments and said ring members.

4. A partially assembled commutator structure comprising a plurality of commutator segments provided with notched portions for retaining said segments against centrifugal action, a plurality of rigid ring members disposed in operative relation to said notched portions for assisting in holding said segments together, and a layer of yieldable, impregnable material surrounding each of said rigid ring members, whereby the structure is adapted to be united, without damage, into a single integral mass by means of fluid impregnating material which is hardened under pressure, the yieldable quality of said layer protecting said rigid ring members from damage when said pressure is applied.

5. A partially assembled commutator structure comprising a plurality of commutator segments provided with notched portions for retaining said segments against centrifugal action, a plurality of rigid conducting ring members disposed in operative relation to said notched portions for assisting in holding said segments together, and a layer of yieldable, impregnable insulating material surrounding each of said rigid ring members, whereby the structure is adapted to be united, without damage, into a single integral mass by means of fluid material which is hardened under pressure, the yieldable quality of said layer protecting said rigid ring members from damage when said pressure is applied.

6. The method of producing a commutator structure which consists in assembling a plurality of commutator segments in operative relation, said segments being provided with notched portions for retaining the same against centrifugal action, assembling a plurality of rigid ring members in operative relation to said notched portions for assisting in holding said segments together, each of said ring members being surrounded by a layer of yieldable, impregnable material, embedding said structure in an integral mass of fluid impregnating material which is hardened under pressure, and subjecting said impregnating material to pressure and hardening the same.

7. A partially assembled commutator structure comprising a plurality of commutator segments provided with notched portions for retaining said segments against centrifugal action, a plurality of rigid ring members disposed in operative relation to said notched portions for assisting in holding said segments together, and a layer of impregnable material surrounding each of said rigid ring members, whereby the structure is adapted to be united into a single integral mass by means of fluid impregnating material which may be subsequently hardened.

8. A partially assembled commutator structure comprising a plurality of commutator segments provided with notched portions for retaining said segments against centrifugal action, a plurality of rigid conducting ring members disposed in operative relation to said notched portions for assisting in holding said segments together, and a layer of impregnable insulating material surrounding each of said rigid ring members, whereby the structure is adapted to be united into a single integral mass by means of fluid impregnating material which may be subsequently hardened.

9. A finished commutator structure comprising a plurality of commutator segments provided with notched portions for retaining said segments against centrifugal action, a plurality of rigid ring members disposed in operative relation to said notched portions for assisting in holding said segments together, an integral mass of molded material embedding said notched portions and ring members, and a layer of impregnated porous material surrounding each of said ring members and forming an integral mass with said molded material.

10. A finished commutator structure comprising a plurality of commutator segments, each segment having a notched portion for retaining said segments against centrifugal action, a metal ring member disposed in operative relation to said notched portions for assisting in holding said segments together, a mass of molded insulating material fitting in said notched portions and embedding said ring member, and a layer of porous insulating material surrounding said ring member and impregnated by said molded material.

11. A partially assembled molded structure comprising a plurality of conducting elements provided with notched portions, a plurality of rigid reinforcing members disposed in operative relation to said notched portions for assisting in holding said conducting elements together, and a layer of yieldable, impregnable material surrounding each of said rigid reinforcing members, whereby the structure is adapted to be united, without damage, into a single integral mass by means of fluid impregnating material which is hardened under pressure, the yieldable quality of said layer protecting said rigid reinforcing members from damage when said pressure is applied.

12. A partially assembled molded structure comprising a plurality of conducting elements provided with notched portions, a plurality of rigid reinforcing members disposed in operative relation to said notched portions for assisting in holding said conducting elements together, and a layer of impregnable material surrounding each of said rigid reinforcing members, whereby the structure is adapted to be united into a single integral mass by means of fluid impregnating material which may be subsequently hardened.

13. A partially assembled molded structure comprising a plurality of conducting elements provided with notched portions, a plurality of rigid reinforcing conducting members disposed in operative relation to said notched portions for assisting in holding said conducting elements together, and a layer of impregnable insulating material surrounding each of said rigid reinforcing members, whereby the structure is adapted to be united into a single integral mass by means of fluid impregnating material which may be subsequently hardened.

14. A finished molded structure comprising a plurality of conducting elements provided with notched portions, a plurality of rigid reinforcing members disposed in operative relation to said notched portions for assisting in holding said conducting elements together, an integral mass of molded material embedding said notched portions and reinforcing members, and a layer of porous material surrounding each of said reinforcing members and forming an integral mass with said molded material.

15. A finished molded structure comprising a plurality of conducting elements, each element having a notched portion for retaining said elements against separation, a metal reinforcing member disposed in operative relation to said notched portions for assisting in holding said elements together, a mass of molded insulating material fitting in said notched portions and embedding said reinforcing member, and a layer of porous insulating material surrounding said reinforcing member and impregnated by said molded material.

In testimony whereof, I have hereunto subscribed my name this 25th day of June 1918.

WILLARD H. KEMPTON.